United States Patent [19]

Pastor

[11] Patent Number: 4,893,338

[45] Date of Patent: Jan. 9, 1990

[54] SYSTEM FOR CONVEYING INFORMATION FOR THE RELIABLE AUTHENTIFICATION OF A PLURALITY OF DOCUMENTS

[75] Inventor: Jose Pastor, Westport, Conn.

[73] Assignee: Pitney Bowes Inc., Stamford, Conn.

[21] Appl. No.: 140,051

[22] Filed: Dec. 31, 1987

[51] Int. Cl.$^4$ .............................................. H04L 9/00
[52] U.S. Cl. ....................................... 380/25; 380/21; 380/30; 380/51
[58] Field of Search ....................... 380/21, 23, 25, 30, 380/51

[56] References Cited

U.S. PATENT DOCUMENTS

| | | | |
|---|---|---|---|
| 4,438,824 | 3/1984 | Mueller-Schloer | 380/30 |
| 4,458,109 | 7/1984 | Mueller-Schloer | 380/30 |
| 4,625,076 | 11/1986 | Okamoto et al. | 380/30 |
| 4,649,233 | 3/1987 | Bass et al. | 380/21 |
| 4,811,393 | 3/1989 | Hazard | 380/21 |
| 4,816,655 | 3/1989 | Musyck et al. | 380/30 |

*Primary Examiner*—Salvatore Cangialosi
*Attorney, Agent, or Firm*—Robert H. Whisker; Melvin J. Scolnick; David E. Pitchenik

[57] ABSTRACT

A system for conveying information for the reliable authentication of a plurality of documents includes a device for solving a set of polynomial equations to develop a string of characters and having a decryption key therein that, upon application to the string of characters provided, reveals not only a plain text message indicating the source of the authentication but, in addition, provides the decryption key for use with the information provided by the mailer. The solution of the set of polynomial equations requires the accumulation of individual documents, each having a random $x_i$ and a solution $f(x_i)$ associated therewith.

11 Claims, 2 Drawing Sheets

SYSTEM FOR CONVEYING INFORMATION FOR THE RELIABLE AUTHENTIFICATION OF A PLURALITY OF DOCUMENTS

BACKGROUND OF THE INVENTION

The present invention generally relates to a system for conveying information for the reliable authentication of a plurality of documents and, in particular, relates to such a system including means for accumulating, from a plurality of individual items, information that, once accumulated, can be used to reliably authenticate each item.

Throughout history one of the tasks undertaken by many people and organizations has been proving the authenticity of documents originating from a common source. The importance of actually proving the authenticity of a plurality of documents can range from merely identifying a signature to verifying military and/or political intelligence. Further, as often as one tries to demonstrate the authenticity of a plurality of documents, there is usually at least one party that attempts to forge one or more of those documents. Hence, there has been, and probably will continue to be, an ongoing struggle to be able to reliably authenticate a plurality of documents.

Over the years technological advances have brought new meaning to the word "document". Today, a document may be, for example, an electronically generated receipt from a banking machine or a digitized recording on an optical recording disk. For the purpose of this patent application, therefore, the word "document" should be interpreted to include any information placed on any medium including, but not limited to, magnetic disks, optical disks or paper.

Another similar task that has just as colorful a history as document authentication is the secure communication of information between two parties. Such secure communication of information commonly includes the use of encryption/decryption techniques. Similar to the forger referred to above, there is usually at least one party that is interested in either stealing the information being communicated that has been encrypted or supplying false information in an encrypted format so that the receiver thereof is disinformed or both. Hence, throughout history various encryption/decryption schemes have been developed that, at least for a time, were thought to be secure only to discover that the security had been compromised. Again, technological advances have considerably changed the field of cryptography. For example, with modern computers many cryptographic techniques can be broken in a relatively short period of time due, primarily, to the speed that computers perform mathematical operations.

One presently secure cryptographic technique is generally known as the public key cryptographic system. One particular form of such a system is fully described and discussed in the basic article entitled "A Method for Obtaining Digital Signatures and Public Key Cryptosystems" by R. L. Rivest, A. Shamir and L. Adelmann, Volume 21 #2, February 1978, Communications of ACM pages 120-126. This particular system is frequently referred to as the RSA public key cryptosystem.

Public key techniques, as pointed out in the article entitled "Public Key Cryptography" by John Smith, in the January 1983 edition of Byte Magazine, pages 189-218, usually include two different kinds of keys: encryption keys and decryption keys. These keys includes the properties that: (a) it is possible to compute a pair of keys including an encryption key and a decryption key; (b) such that, for each pair, the decryption key that is not the same as the encryption key; and (c) it is not feasible to compute the decryption key even from the knowledge of the encryption key. In addition, in such a cryptosystem, the encryption and decryption keys are functionally reversible, i.e. if one key is used to encrypt the other key can be used to decrypt whatever has been encrypted.

As known, the name "public key" is derived from the fact that each party's encryption key is available, i.e. public, to all parties subscribing to the particular public key network involved. Hence, as currently used, public key cryptographic systems are designed for the direct communication between any two subscribing parties, each party having an unpublished decryption key and a published encryption key.

The public key cryptographic system has also found use in providing accurate identification of the source of a document. As discussed on pages 217-218 of the Smith article, a sender can effectively sign a message by first encrypt the message, or an authenticating portion thereof, such as, for example, the name of the sender using the private decryption key of the sender and then encrypt the message with the public encryption key of the receiving party. This results in a message portion that only the sender could have created and only the receiver can read. Hence, two party communication can, so long as public key cryptographic systems are secure, be implemented in such a fashion that the authenticity of a document can be ensured.

Nonetheless, there remain many instances where there is a need, or desire, for a third party to authenticate a document relevant to, or communicated between, two other parties. One example of such a situation would exist if a first party were required, or simply desired, to prove, or demonstrate, the authenticity of a particular document to a second party. In such a situation, it could be most beneficial if a third party could provide a means for authenticating that document. One particular situation could exist where a dispute over the authenticity of a document arose between two parties and an impartial third party was selected to resolve the issue to the satisfaction of both parties. Such a situation might arise when, in accordance with an agreement between two parties, one of the parties was to maintain certain records such that the second party could review those records to ensure compliance with the agreement. In such a situation it would be most beneficial if a third party were available to demonstrate the accuracy/inaccuracy of the records to the auditing second party.

Another more widely known situation that is representative of third party authentication of a plurality of documents is in the mail handling field wherein a mailer must prove to a postal delivery service the authenticity of having paid for the postage for each particular mailing. Currently, the United States Postal Service (USPS) accepts the indicia on an envelope applied by a mailer as representing that the postage required for the delivery of that envelope has been paid. In fact, in many instances, the indicia is applied by, for example, a leased postage meter and the manufacturer of the postage meter ensures to the USPS that when that postage meter is actuated to print the indicia, the postage, or the monetary value of the postage, has been paid. At the present time, postage meters apply the indicia to an envelope via a mechanical printing means such as a drum having the indicia etched thereon or via the impressing of a platen upon an envelope. However, due primarily to technological advances, the wide spread use of contactless printing has made it desirable to utilize such techniques in a mail handling system. However, the use of contactless printing techniques, at the present time, can lead to inaccurate accounting unless secure techniques are provided.

One secure technique would be the use of common encryption techniques wherein a mailer would have a cryptographic key that would allow the mailer to encrypt information and place that information on the envelope. The USPS, for example, could then, by using an identical cryptographic key, decrypt the information on the envelope and ensure that the proper postage for the delivery thereof has been paid. One major drawback of such a system, of course, is that there exists many thousands of mailers and hence, the USPS would be required to maintain a very large data base of cryptographic keys to enable it to decrypt all the different encryption keys distributed to the various mailers.

Alternatively, the need for a rather massive data base can be obviated by use of a system such as that described and discussed in copending U.S. Patent Application Ser. No. 136,251 filed on Dec. 18, 1987 and entitled RELIABLE DOCUMENT AUTHENTICATION SYSTEM. The above-identified application is assigned to the assignee hereof and incorporated herein by reference.

The system described in the above-identified copending patent application includes the implementation of a three party public key cryptographic system. In that system, at least insofar as it related to a mail handling system, a mailer is, in essence, provided with two pieces of information. One piece of information enables the mailer to encrypt information relating to a mailing. The other piece of information enables the postal delivery service to not only decrypt the mailer encrypted information, but to also authenticate each document. Thus, in one embodiment, each envelope includes user variable information and user specific (fixed) information. However, to ensure security, each of the two pieces of information typically would include between one and two hundred (100-200) digits. Thus, this, in itself, can be a considerable drawback to the speed and efficiency of such a system.

Consequently, it would be highly desirable to provide a system for reliably conveying information for authenticating a plurality of documents in general and, to convey such information such that the authenticating information can be determined only from a plurality of individual items.

SUMMARY OF THE INVENTION

Accordingly, it is one object of the present invention to provide a system for conveying information for the reliable authentication of a plurality of documents that substantially overcomes the above recited drawbacks.

This object is accomplished, at least in part, by a system including means for accumulating, from a plurality of individual items, information that can be used to reliably authenticate each item.

Other objects and advantages will become apparent to those skilled in the art from the following detailed description read in conjunction with the appended claims and the drawings attached hereto.

DETAILED DESCRIPTION OF THE INVENTION

Figure 1:
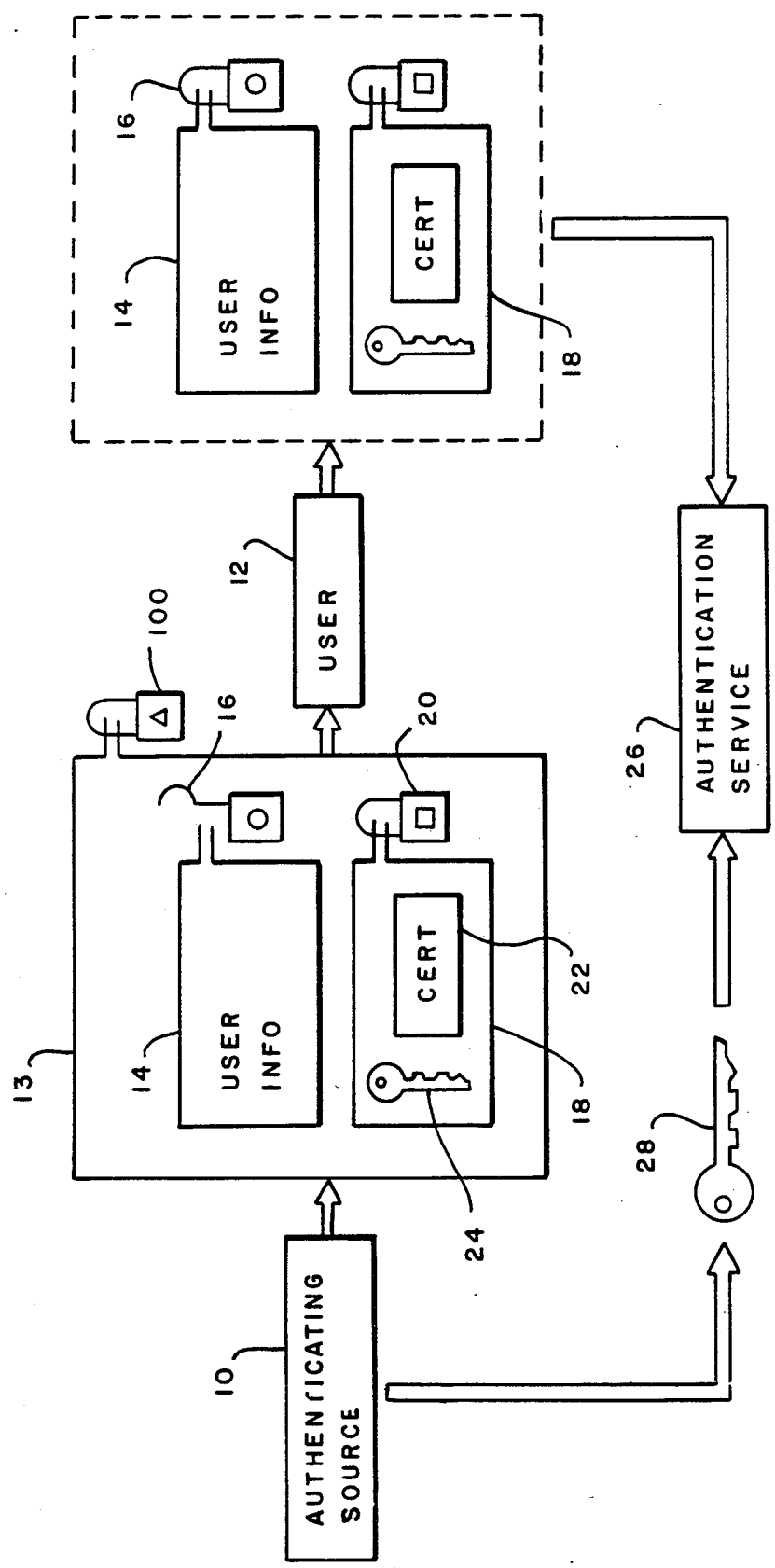
FIG. 1 is a diagram of a conceptual system embodying the principles of the present invention.

As discussed in the above-referenced patent application, a neutral third party, generally indicated at 10, as an authenticating source, in FIG. 1, establishes a number of encryption/decryption public key pairs. When a user 12 wishes to take advantage of the service offered by the authenticating source 10, a pair of keys are selected and assigned to the user 12 when he joins the service. That is the user 12 is provided with the key $E_2$ of the pair $E_2D_2$. The user 12 is then preferably provided with a box 13 that contains boxes 14 and 18. Box 13 is locked with lock 100. Lock 100 has been locked with the key $D_2$ that can be unlocked only by the key $E_2$. User 12, unlocks the box 100 with key $E_2$ and opens box 13 to find first and second boxes 14 and 18. Alternatively, the user 12 may only be provided with the first box 14 and the second box 18. Regardless, the first box 14 has an open lock 16, the lock 16 representing the encryption/decryption operations with the assigned pair of keys $E_2D_2$. In addition, the user 12 is provided with a second box 18 that is locked by lock 20, the locked box 18 being locked via the encryption key $E_1$ of an unassigned pair of keys, $E_1D_1$, the unassigned encryption key $E_1$ being maintained in absolute privacy by the authenticating source 10. The second box 18, essentially, contains a certificate 22 indicative of the authenticating source 10 and the decryption key ($D_2$) 24 of the assigned pair of keys to open the locked box 14 provided to the user 12 in an unlocked condition. The user 12 then places information, or documentation, that is unique to the user 12 within the unlocked first box 14 and closes the lock 16 with key $E_2$. The user 12, in this conceptualization, would then take both locked boxes 14 and 18 to the authentication service 26. The authentication service 26 is provided with the decryption key $D_1$ 28 by the authenticating source 10. This key $D_1$ is common to all the locks of all of the second boxes 18 created by the authenticating source 10. The corresponding encryption key $E_1$ of the unassigned pair of keys, as mentioned above, being maintained in privacy by the authenticating source 10.

Hence, to authenticate the document provided from the user 12, the authentication service 26 simply unlocks, i.e. decrypts, the locked second box 18 and immediately recognizes the certificate 22 of authenticity from the authenticating source 10. Should the authentication service 26 then wish to ascertain, for verification thereof or for any other purpose, the user information, the decryption key 24 of the assigned pair of keys is now available for the authentication service 26 to unlock the first box 14 that was unlocked when provided to the user 12.

As a result, any number of users 12 can request any number of unlocked boxes 14 whereinto they wish to place information for authentication by the authentication service 26. However, the authentication service 26 needs to retain only the single decryption key 28 corresponding to all of the locks of all of the second locked boxes 18 provided to the users 12. Thus, each second box 18, as mentioned above, contains both the certificate 22 of authenticity and the decryption key 24 of the assigned pair of keys to unlock the first box 14 containing user information.

Thus, there is no public key in this "public key" cryptography system and, although the system is like a secret key system, for example, DES, the need for the authentication service 26 to maintain a massive database is eliminated since all locks of all second boxed 18 originally given to user 12 can be unlocked by the single decryption key 28 of the assigned pair of keys provided to the authentication service 26 by the authenticating source 10. Furthermore, unless there is an overriding need, the simple unlocking of the locked second boxes 18 provided to users 12 by the authentication service 10 is quite sufficient to demonstrate that the user 12 is operating within the system because to have access to the second box 18 the user 12 has, upon receipt of box 13, has had to unlock lock 100 with the key $E_2$ that only that user 12 possesses. Hence, the user information can, in fact, be retained in privacy and complete secrecy. Further, the actual information can, nonetheless, be accessed, should it become necessary, buy use of the decryption key 24 of the assigned pair of keys accompanying the certificate 22 of authority.

As more fully discussed hereinafter, in one embodiment the open lock 16 accompanying the first box 14 would be closed with the encryption key of the public encryption/decryption key pair, $E_2D_2$, assigned to the user 12. The key 24 within the locked second box 18 would be the decryption key $D_2$ of the public key encryption/decryption key pair, $E_2D_2$ assigned to the user 12. The second box 18 is locked by encrypting the certificate 22 of authenticity and the decryption key 24 to the first box 14 with the encryption key $E_1$ of the encrypted, assigned pair of keys, thus would be represented, for example, by a string of digits. The key 28 provided to the authentication service 26 would be the decryption key $D_1$ of the unassigned pair of keys kept private by the authenticating source. Since, at least with respect to an RSA public key cryptographic system, the security increases as the prime numbers product serving as the basis for key pair generation increases each document of the present system may include two sets of digits, each set having at least one hundred digits. Typically, one set of digits would represent the encrypted user information that would generally vary for each document. The other set of digits would represent the second locked box 18 and generally would be invariant for each document generated by the user 12 of an assigned pair of keys.

In the above-discussed system, as with any public key type cryptosystem, each set of digits would, to enhance security, include perhaps one to two hundred (100–200) digits. This number of digits required on each document can be reduced when a single user 12 is delivering a plurality of documents to the authenticating service 26.

By way of example only, in one embodiment, a particular user 12 is a mailer who delivers his mail to the USPS (authentication service 26). In order to reduce the number of characters of the invariant set printed on each envelope a number N is chosen. The number N represents the number of envelopes that must be accumulated by the USPS to reconstruct the invariant set of characters. The invariant set of characters is then divided into N blocks of characters. Each N is used as a coefficient 'a' in, for example a polynomial of the form $$f(x_i) = a_1 x_i + a_2(x_i)^2 \cdots a_n(x_i)^n$$

Each coefficient is less than a prime number 'P', and all equations are performed in Modulus P similar to a technique discussed by Adi Shamir in "How to Share a Secret", in Communication of the ACM, November, 1979; Vol. 22; No. 11; pgs. 612–613. Differently, however, is that Shamir uses the entire secret as one of the coefficients. Hence, the prime number 'P' thereof is longer than the secret. Therefore, since all of the operates are with a Modulus P, all of the values could be as long as 'P'. Hence, the Shamir technique would not reduce the length of the information printed.

The user 12 then randomly generates the x's, solves the polynomial and prints $x_i$, $f(x_i)$ on each envelope. Hence, knowing the degree of the polynomial, i.e. the highest exponent, either from the authenticating source 10 of from the user 12, the authenticating service 26 can accumulate 'n' pieces of mail and solve the set of equations to reconstruct the invariant set. Thereafter, the invariant set of characters can be decrypted to obtain the certificate 22 of authenticity.

In an alternative embodiment, the authenticating source 10 can provide the user 12 with the invariant set of characters already in the form of the coefficients $a_1$.

Figure 2:
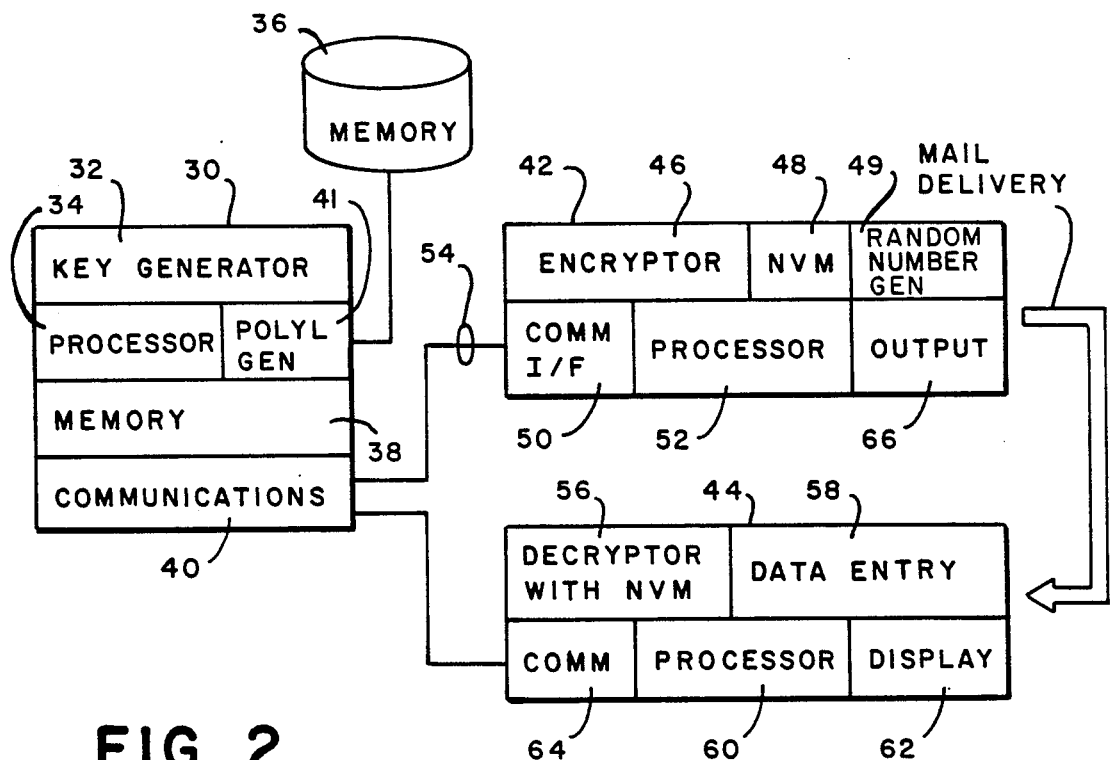
FIG. 2 is a block diagram of a system embodying the principles of the present invention.

A system 29 for reliably authenticating documents is shown in FIG. 2 wherein the authenticating source 30 includes a public key pair generator 32, a processing unit 34, a nonvolatile memory 36, a real time operating memory 38 and a communications interface 40 and, in one embodiment a polynomial generator 41. Preferably, the public key pair generator 32 includes an RSA public key encryption/decryption key generator that may incorporate therewithin an RSA encryption/decryption chip available from, for example, CYLINK of Sunnyvale, California.

The processing unit 34 can be any general purpose processor or computer, adapted to manipulate the information in accordance with the desired function thereof.

Preferably, the nonvolatile memory 36 can be a magnetic disk, magnetic tape or the like, accessible by the processing unit 34. The real time operating memory 38 can include, inter alia, a semiconductor random access memory or floppy disk.

In one specific embodiment, the communications interface 40 can include a telecommunication PC plug-in card. The communications interface 40 is preferably connected to both a mailer 42 and a mail service provider 44.

The mailer 42 includes an encryptor module 46 adapted for encrypting information via an RSA public key cryptography system. In addition, the mailer 42 includes a nonvolatile memory 48 wherein the key of the assigned public key pair is stored and a random number generator 49. A compatible communications interface 50 is provided to allow remote communications with the authenticating source 30 and a processor 52 is included to allow the manipulation of the encrypted information received inputted by the mailer 42 via the input device 54.

Subsequent to preparing mail, the mailer 42 delivers that mail to the authenticating service 44 that, for example, can be any local post office. In this particular embodiment, the service 44 includes a decryption device 56, including a decryptor module having a nonvolatile memory associated therewith wherein the decryption key of the unassigned public key pair for this particular system is stored. The decryption key of the unassigned public key pair can, in one embodiment, be the same for every service 44 location. However, if desired, the decryption key of the service 44 locations could be, for example, geographically dependent but nevertheless, uniform throughout a particular geographical region. Nevertheless, none of the service 44 locations needs to maintain a database of keys. In addition, the authenticating service 44 includes a data entry means 58 that can be, for example, a keyboard, an optical reader or any other means for transferring information from the face of, for example, an envelope or manifest to a processor 60 within the decryption device 56. The processor 60 also initially solves the polynomial to provide the decryption device 56 with the invariant set of characters to be decrypted. Preferably, the decryption device 56 further includes a display 62 to provide for a rapid indication either visual or audio, of the authenticity of the information on the envelope being checked. Further, in one particular embodiment, the decryption device 56 is adapted to communicate via a communications interface 64 with the authentication source 30.

Figure 3:
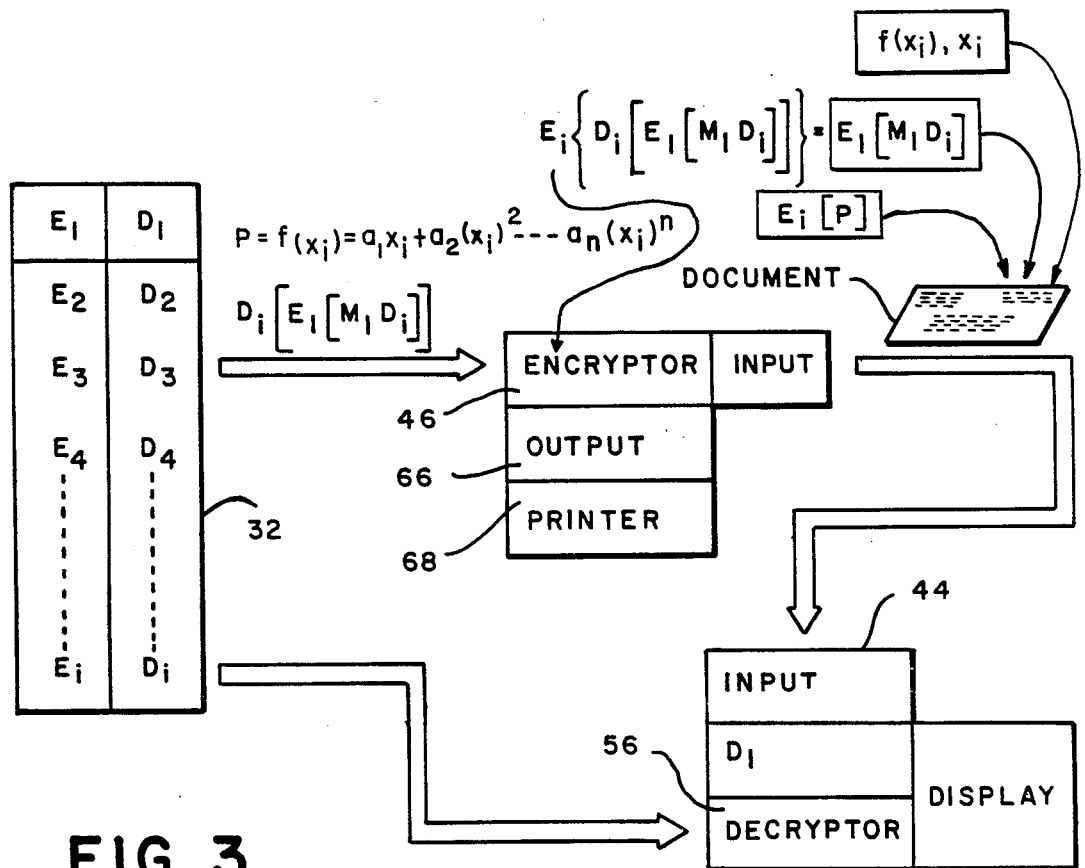
FIG. 3 is a diagram representing the flow of information in the system shown in FIG. 2.

The information flow for the typical system 29 shown in FIG. 2 is more clearly depicted in FIG. 3. Therein a table 32 of public key encryption/decryption key pairs is shown as would be generated by the key generator 32 of the authenticating source 30. As shown, a pair of these keys is assigned, from the table of keys to a user 42 upon request or upon a regulated change of key. Preferably, in order to enhance the speed of authentication, a message (M) in plain text is encrypted using the unassigned encryption key that is maintained in private by the authenticating source. In addition to the message, the assigned decryption key corresponding to the assigned encryption key provided to the user 42 is also encrypted using the unassigned encryption key. Further, in one embodiment, a polynomial $f(x_i)$ is generated for each pair of keys to be assigned to users 12. This polynomial is forwarded to the user 12.

In operation, the user 42 can then input information, such as, for example, mailing information, and receive therefrom an encrypted output message. The encrypted output message is outputted via an output 66 to be, in one embodiment, printed upon an envelope, or other mailing document, by any means available to the mailer such as, for example, a contactless printer 68. In addition, the calculated $f(x_i)$, $x_i$ of the invariant set of characters is also applied to the envelopes.

The mail is thereafter presented to the postal service 44 for payment, processing, delivery etc. At this time, the postal service 44 may elect to authenticate one or more of the mail pieces. In order to perform the authentication, 'n' different envelopes are accumulated and the $f(x_i)$, $x_i$ from each are entered into the processor. The processor solves the polynomials and inputs the invariant set of characters into the decryption device 56 whereupon it is decrypted by use of the decryption key of the unassigned public key pair generated by the authenticating source 30 and corresponding to the encryption key that is maintained in private. Upon decryption the authenticity is determined, i.e. the mail piece or document is correct and, in accordance with regulations set forth by the authenticity source 30. Alternatively, the display 62 can so indicate authenticity even if the specific document is not from that user 12. The identity of the user 12, however, can be ensured if the authenticating source 10 encrypts the message (M) and the assigned decryption key corresponding to the assigned encryption key using the assigned decryption key. This is possible since the key function, i.e. encryption or decryption, is reversible. Hence, in order for the user 12 to obtain the necessary information to place on a mailing document, i.e. the encrypted message (M) and the assigned decryption key, the user 12 must first decrypt, using the assigned encryption key, the information given by the authenticating source 10. Thus, if the postal service 44 decrypts the information on the mailing document and recognizes the message (M) the identify of the user 12 is proven.

In an alternative embodiment wherein the authenticating source 10 and the user 12 share a single identical key, then the user 12 can print a truncated portion of the encrypted variant information. The authenticating service 26 can, if desired, reconstruct the truncated portion by encrypting the plain text variant information from the envelope.

Advantageously, in addition to providing a reliable system for authenticating a plurality of documents, the system 29 described herein is advantageous since less information is required on each envelope. Further, since new pairs of keys can be assigned to mailers 42 without the post office key being updated. This is of particular interest since key synchronization, when keys are frequently altered, is difficult to maintain in many systems. For example, in systems where each key is used only a single time and keys are used in a prearranged sequence, there is the problem that messages may not be received in order. Thus, if two messages are transposed, the destination key may not match the source key. In the present system 29 this is not a problem since the requisite decryption is, in the macroscopic scheme, common to all messages and in the user specific scheme, the decryption key information accompanies the message itself and therefore cannot possibly get out of order. Indeed, the mailer 42 could use any number of assigned keys in a random sequence, reuse keys, or not use keys at all without affecting the authentication service 44.

Thus, in a mail handling system 29 where a substantial number of keys are used for a substantial number of mailers 42, such a system provides distinct advantages. For example, the post office need not maintain a database at all, in fact, it need only maintain a single decryption key thereby reducing security problems as well as databasing problems. In addition, the mailer 42 can be assigned a new key any time without concern that the post office will not be updated by the time the message so encrypted arrives. Thus, any number of keys can be used for any number of different or, in fact, identical transmissions while being completely sure that the post office can decode each and every message. Still further, the ordinary security problems related to any form of cryptographic system are compartmentalized. For example, the loss of security in one link of the system 29 does not destroy the integrity of the entire system. Furthermore, as a benefit to the mailer, while currently in some forms of mailing is required to deposit his mail with a predesignated post office, this requirement can be removed. The removal of this requirement results from the fact that each and every post office can be provided with the same decryption key and, as a result, any mailer 42 can deposit his mail with any post office and know that the post office receiving that mail can, nevertheless, determine the authenticity of the information carried thereon.

It will be understood that the mailer 42 can provide the information on an envelope by using a meter rather than a contactless printing mechanism. In such an embodiment, the actuation of the printer associated with the meter would be dependent upon receipt of proper information from the mailer 42. Such information would be conveyed as proof of payment with the mail to the post office.

Although the present system has been described herein with respect to a particular system, it will be understood that other arrangements and configurations may be developed by those skilled in the art without departing from the spirit and scope of the present invention. Consequently, the scope of the present invention is deemed limited only by the appended claims and a reasonable interpretation thereof.

What is claimed is:

1. A system for authenticating a plurality of documents, said system comprises:
    an authenticating source, said authenticating source including means for providing a first public key encryption key to a third party;
    means, associated with said source, for providing an authentication message to said third party in the form of coefficient of a polynomial, said authentication message being encrypted by a second public key encryption key and including the decryption key for said first public key encryption key;
    means, associated with said third party, for generating variables and values to said polynomial and applying different ones of said variables and value to each of said plurality of documents;
    means, associated with an authenticating service, for recovering said authentication message from a plurality of different ones of said variables and values; and
    means, associated with said source, for providing the decryption key corresponding to said second public key encryption key to said authenticating service such that said authentication message can be decrypted.

2. System as claimed in claim 1 wherein said authentication message is again encrypted using said decryption key for said first public key encryption key.

3. System as claimed in claim 1 wherein said authentication message further includes a certification message that, when said message is decrypted, provides plain text verification that said authentication message originated from said authentication source.

4. System as claimed in claim 3 wherein said third party is a mailer of a plurality of mail pieces and said first public key encryption key is used to encrypt mail related information.

5. System as claimed in claim 4 wherein said mail related information is applied to each of a plurality of mail documents and each said variables and corresponding values are applied to different ones of said plurality of mail documents.

6. System as claimed in claim 1 wherein said generating means includes a random number generator associated therewith.

7. System as claimed in claim 1 further comprising means for providing said authenticating service with the order of said polynomial.

8. System as claimed in claim 7 wherein said polynomial providing means is associated with said authenticating source.

9. System as claimed in claim 7 wherein said polynomial providing means is associated with said third party.

10. A system for authenticating a plurality of documents, said system comprises:
    an authenticating source, said authenticating source including means for providing an encryption/decryption key to a third party;
    means, associated with said source, for providing an authentication message to said third party in the form of coefficients of a polynomial, said authentication message being encrypted by a public key encryption key and including said encryption/decryption key;
    means, associated with said third party, for generating variables and values to said polynomial and applying different ones of said variables and value to each of said plurality of documents;
    means, associated with an authenticating service, for recovering said authentication message from a plurality of different ones of said variables and values; and
    means, associated with said source, for providing the decryption key corresponding to said public key encryption key to said authenticating service such that said authentication message can be decrypted.

11. System as claimed in claim 10 wherein said mail related information on said envelope is a truncated portion of the encrypted mail related information.

* * * * *